United States Patent [19]
Dahl

[11] 3,734,051
[45] May 22, 1973

[54] VEHICLE WHEEL POSITION INDICATOR

[76] Inventor: Eileen C. Dahl, 5024 Dupont Avenue South, Minneapolis, Minn. 55419

[22] Filed: Aug. 5, 1971

[21] Appl. No.: 169,378

[52] U.S. Cl. .................................116/31, 33/215 B
[51] Int. Cl. .................................................B60q 1/42
[58] Field of Search ..........116/31, 114 AH, DIG. 13; 73/492, 124, 514; 33/215 B, 215 C, 2; 37/DIG. 14, DIG. 19

[56] References Cited

UNITED STATES PATENTS

| | | |
|---|---|---|
| 2,707,451 | 5/1955 | Brink.........................................116/31 |
| 2,845,893 | 8/1958 | Eshbaugh et al. .......................116/31 |
| 3,372,668 | 3/1968 | Chambers ................................116/31 |

FOREIGN PATENTS OR APPLICATIONS

| | | |
|---|---|---|
| 534,908 | 2/1955 | Belgium ...................................116/31 |

*Primary Examiner*—Louis J. Capozi
*Attorney*—Reif and Gregory

[57] ABSTRACT

A directional position indicator for the front wheels of a vehicle consisting of a housing mounted on a steering wheel, a pinion gear journaled in said housing, a weighted arm extending radially of said gear and being integral therewith, a pair of gears journaled in said housing in opposed relation at either side of said pinion gear and said pair of gears respectively bearing indicia visible through said housing indicating the directional position of the front wheels of said vehicle.

3 Claims, 4 Drawing Figures

PATENTED MAY 22 1973          3,734,051

INVENTOR.
EILEEN C. DAHL
BY
Richard Gregory
ATTORNEYS

VEHICLE WHEEL POSITION INDICATOR

BACKGROUND AND SUMMARY OF INVENTION

The invention herein relates to a device to be mounted on to the steering wheel of a vehicle to indicate the directional position of the front wheels of said vehicle.

There are various situations in maneuvering to park a vehicle with respect to straightening out or angling the position of the front wheels wherein the operator has difficulty in determining from the position of the steering wheel the exact directional position of the front wheels of the vehicle. This is particularly the case with the vehicle being close to a curb in trying to determine whether the front wheels of the vehicle are in a parallel or angled relationship with respect to the curb. A partial rotation of the steering wheel is all that is required to change the directional position of the wheels for the extent of directional change required in such a situation.

It is desirable therefore and an object of this invention to provide readily observable means to indicate to the operator the directional position of the front wheels of the vehicle.

It is another object of this invention to provide means readily mounted onto the steering wheel of a vehicle to indicate the directional position of the front wheels of the vehicle.

Generally stated it is an object of this invention to provide a small housing which may be readily mounted onto and secured to the hub portion of the steering wheel of a vehicle, said housing including a freely rotatable gear mounted therein having a weighted radial arm integral therewith and a pair of idler gears mounted within said housing at either side of said gear and having engagement therewith to be rotated thereby, said pair of gears respectively bearing indicia to indicate the directional position of the front wheels of the vehicle. Said weighted arm of said first gear causes relative movement between said first mentioned gear and said idler gears as the steering wheel is turned in one direction or the other whereby the indicia on said idler gears indicate the directional position of the front wheels of the vehicle with respect to the extent that the steering wheel has been turned. It will be understood that the invention herein has particular significance in indicating the position of said wheels of a vehicle as it is being parked.

It is also an object of this invention to provide means to indicate the directional position of the front wheels of a vehicle which means is readily mounted upon the steering wheel of the vehicle and operates merely in connection with the turning motion of the steering wheel and has no direct connective association with the steering linkage of the vehicle.

These and other objects and advantages of the invention will be set forth in the following description made in connection with the accompanying drawings in which like reference characters refer to similar parts throughout the several views and in which.

DESCRIPTION OF PREFERRED EMBODIMENT

Figure 1:
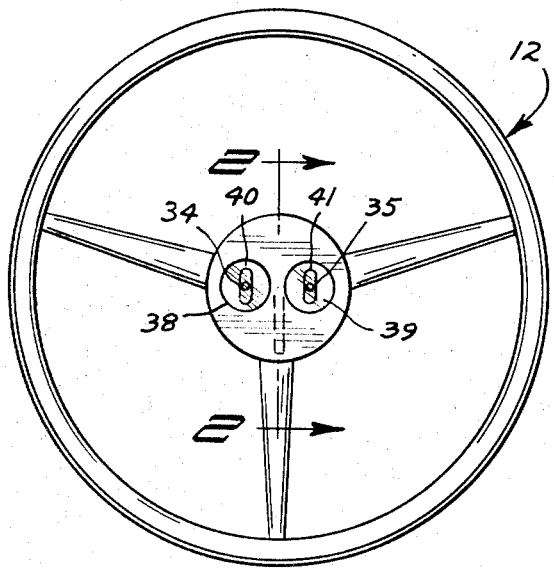
FIG. 1 is a top plane view of a steering wheel of a vehicle showing the invention herein mounted thereon.
Figure 2:
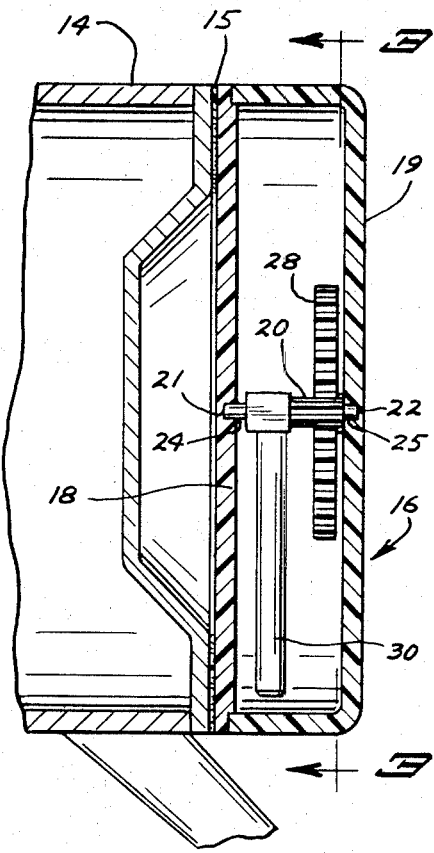
FIG. 2 is a broken view in vertical section taken as line 2—2 of FIG. 1 as indicated.
Figure 3:
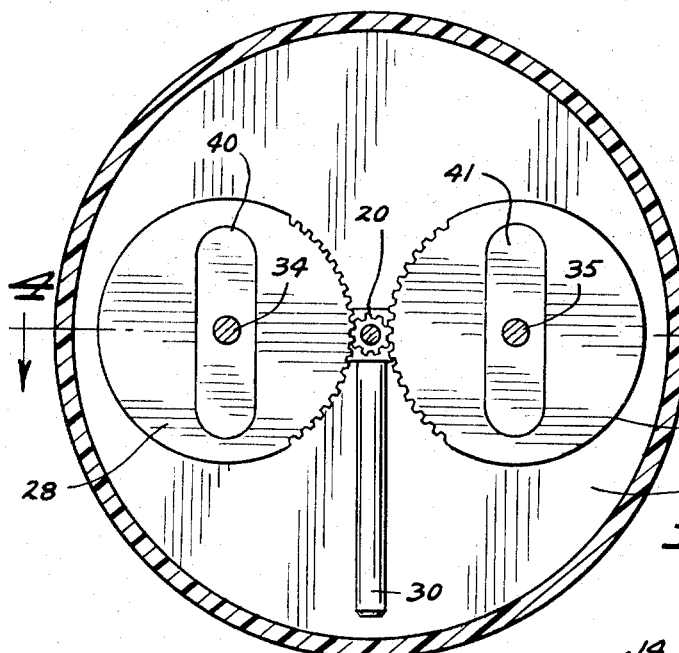
FIG. 3 is a view in vertical section taken on line 3—3 of FIG. 2 as indicated.
Figure 4:
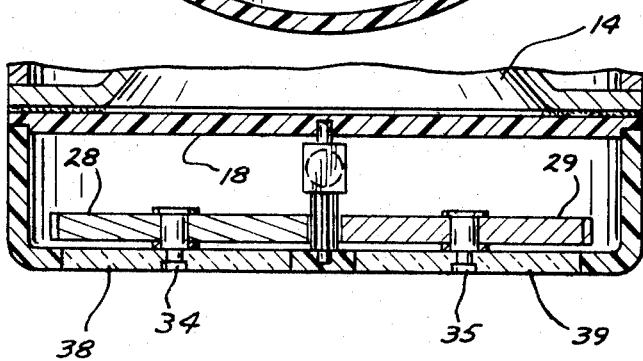
FIG. 4 is a broken view in horizontal section taken on line 4—4 of FIG. 3 as indicated.

Referring to the drawings, a steering wheel 12 of an automotive vehicle is indicated including a broken view of its hub portion 14.

Mounted on said hub portion 14 is a relatively flat cylindrical housing 16 which may be formed of suitable metal or plastic material and may be variously secured to said hub portion as by an adhesive, 15.

Said housing will have a small length just sufficient to accommodate the elements to be disposed therein as hereinafter described and preferably will have a diameter the width of said hub portion.

Said housing 16 comprises an annular side wall 17, a rear wall 18 and a front wall 19 integral therewith. When said housing is in assembled condition said rear wall will be secured to said side wall to be integral therewith as with the use of an adhesive to form a sealed unit.

Disposed centrally within said housing is a pinion gear 20 having stub shafts 21 and 22 at either end thereof respectively journaled in accommodating aligned recessed portions 24 and 25 of said rear and front walls. Extending from said pinion gear radially thereof and rigid therewith is a weighted arm 30. Said arm will be carried by said pinion gear in the embodiment which is here shown adjacent the rear portion thereof.

Mounted in said housing in transverse spaced relation are a pair of relatively flat idler gears 28 and 29 disposed at either side of said pinion gear and having meshing engagement therewith. Said gears 28 and 29 are respectively journaled on stub shafts or pins 34 and 35 which are carried by and extend inwardly of said front wall 19. Said weighted arm 30 is shown disposed behind said gears 28 and 29 to be unobstructed for free swinging movement. Preferably said front wall 19 will be non-transparent or opaque with the exception of clear window portions 38 and 39 to permit the central portions of said gears 28 and 29 to be observed therethrough. Carried on the face of said gears 28 and 29 respectively will indicia 40 and 41 to indicate the front wheels of the vehicle and to show their directional position.

OPERATION

It will be understood that in mounting the housing 16 onto the hub portion 14, it will first be made certain that the front wheels of the vehicle are in a true straight ahead position and that the indicia 40 and 41 are in a like position.

It will be understood that the pinion gear 20 is freely journaled between the front and rear walls of said housing 16 and that the gears 28 and 29 are rotated by the action of said pinion gear 20.

As the steering wheel is turned, the housing 16 will be rotated and the gears 28 and 29 will describe a circular path about the axis of said pinion gear. As the gears 28 and 29 are moved by said steering wheel, the pinion gear in being in mesh with said gears will be moved therewith about its axis. As the gear 20 moves with said gears 28 and 29, there will be no relative motion therebetween. However, as the gear 20 commences to so move and correspondingly move the arm 30, said arm will be sufficiently weighted to return to a depending vertical position.

The constant return of said arm 30 to a depending position rotates said gear 20 to move the same to its initial or starting position. Thus there results relative movement between said gear 20 and the gears 28 and 29. Said gears 28 and 29 will be rotated oppositely one another and the indicia 40 and 41 will move in parallel relationship with respect to one another to the right or to the left in accordance with the direction the steering wheel is turned.

The turning ratio between said gear 20 and the gears 28 and 29 will be determined according to the turning ratio of the steering assembly of any given vehicle to have the indicia 40 and 41 indicate the actual directional position of the front wheels of the vehicle.

It will be understood that the device herein is not intended to be used where turning involves as much as one complete revolution of the steering wheel of the vehicle. The essential purpose of the device herein is to indicate to an operator, as in parking a vehicle, whether the front wheels are parallel to the street curb or are directionally angled with respect to it. This kind of turning only requires on the order of a quarter turn of the steering wheel in one direction or the other from a central position to straighten or directionally angle the front wheels of the vehicle, as may be desired. The wheel direction indication of the device herein though particularly operable in a limited area is extremely helpful within the area in which the device is operable.

It will of course be understood that various changes may be made in form, details, arrangement and proportions of the parts without departing from the scope of the invention herein which, generally stated, consists in an apparatus capable of carrying out the objects above set forth, in the parts and combinations of parts disclosed and defined in the appended claims.

What is claimed is:

1. A vehicle wheel position indicator having in combination
   a housing carried on the steering wheel of said vehicle rotatable therewith,
   a gear freely rotatable journaled in said housing,
   a second gear journaled in said housing having operative engagement with said first mentioned gear,
   a weighted arm carried by said first mentioned gear being rigid therewith and being arranged and adapted to maintain a vertically disposed position, and
   indicia on said second gear indicating the directional position of the front wheels of said vehicle,
   whereby rotation of said steering wheel and the housing carried thereby in connection with said weighted arm causes relative rotation between said gears and the rotation of said second gear by means of said indicia therein indicates the directional position of the front wheels of said vehicle.

2. The structure set forth in claim 1, including
   a third gear journaled in said housing
   said third gear bearing indicia in parallel relationship to said indicia of said second gear, and
   said third gear having operative engagement with said first mentioned gear.

3. The structure set forth in claim 1, including
   a third gear journaled in said housing
   said third gear bearing indicia positioned thereon to be in parallel relationship to said indicia of said second mentioned gear, and
   said third gear having operative engagement with said first gear.

* * * * *